US011359591B2

(12) United States Patent
Nefzger et al.

(10) Patent No.: US 11,359,591 B2
(45) Date of Patent: Jun. 14, 2022

(54) STARTER DEVICE, PULLEY ASSEMBLY FOR A STARTER DEVICE, AND CONNECTING SPRING FOR A PULLEY ASSEMBLY

(71) Applicant: Andreas Stihl AG & Co. KG, Waiblingen (DE)

(72) Inventors: Markus Nefzger, Stuttgart (DE); Carel Karrar, Rechberghausen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 11 days.

(21) Appl. No.: 16/813,871

(22) Filed: Mar. 10, 2020

(65) Prior Publication Data
US 2020/0291912 A1 Sep. 17, 2020

(30) Foreign Application Priority Data
Mar. 12, 2019 (EP) ..................................... 19162190

(51) Int. Cl.
*F02N 1/00* (2006.01)
*F02N 3/02* (2006.01)
*F16H 55/36* (2006.01)

(52) U.S. Cl.
CPC .............. *F02N 3/02* (2013.01); *F16H 55/36* (2013.01)

(58) Field of Classification Search
CPC ................................ F02N 5/02; F02N 15/0062
See application file for complete search history.

(56) References Cited

U.S. PATENT DOCUMENTS

| 3,216,528 | A | 11/1965 | Lohr |
| 3,858,566 | A | 1/1975 | Perry |
| 4,492,190 | A | 1/1985 | Greenwood et al. |
| 4,637,360 | A | 1/1987 | Osakabe |
| 6,971,359 | B2* | 12/2005 | Tohyama .................. F02N 3/02 |
| | | | 123/185.3 |
| 9,797,359 | B2* | 10/2017 | Kullberg ................... F02N 3/02 |
| 2004/0177823 | A1 | 9/2004 | Saito |
| 2006/0196612 | A1 | 9/2006 | Strand et al. |
| 2020/0378351 | A1* | 12/2020 | Frankenberg ............. F02N 3/02 |

FOREIGN PATENT DOCUMENTS

| CN | 202 832 925 | 3/2013 |
| JP | H11-4827 | 1/1999 |
| JP | 4069971 | 9/2003 |
| WO | 2015/072900 | 5/2015 |

* cited by examiner

*Primary Examiner* — John Kwon
(74) *Attorney, Agent, or Firm* — Gudrun E. Huckett

(57) ABSTRACT

A pulley assembly for a starter device for starting an internal combustion engine of a hand-guided power tool has a pulley with an axis of rotation extending in axial direction. A circumferential side of the pulley is positioned outwardly in radial direction relative to the axis of rotation. A circumferential recess is arranged at the circumferential side and accommodates a starter rope. The pulley is provided with a spring receptacle. A connecting spring is disposed in the spring receptacle and has a first end fixedly connected to the pulley. The spring receptacle and the recess overlap each other, viewed in the axial direction and viewed in the radial direction. A starter device is provided with the pulley assembly and a second end of the connecting spring is fixedly connected to a coupling device of the starter device that couples the pulley to the crankshaft of the combustion engine.

18 Claims, 6 Drawing Sheets

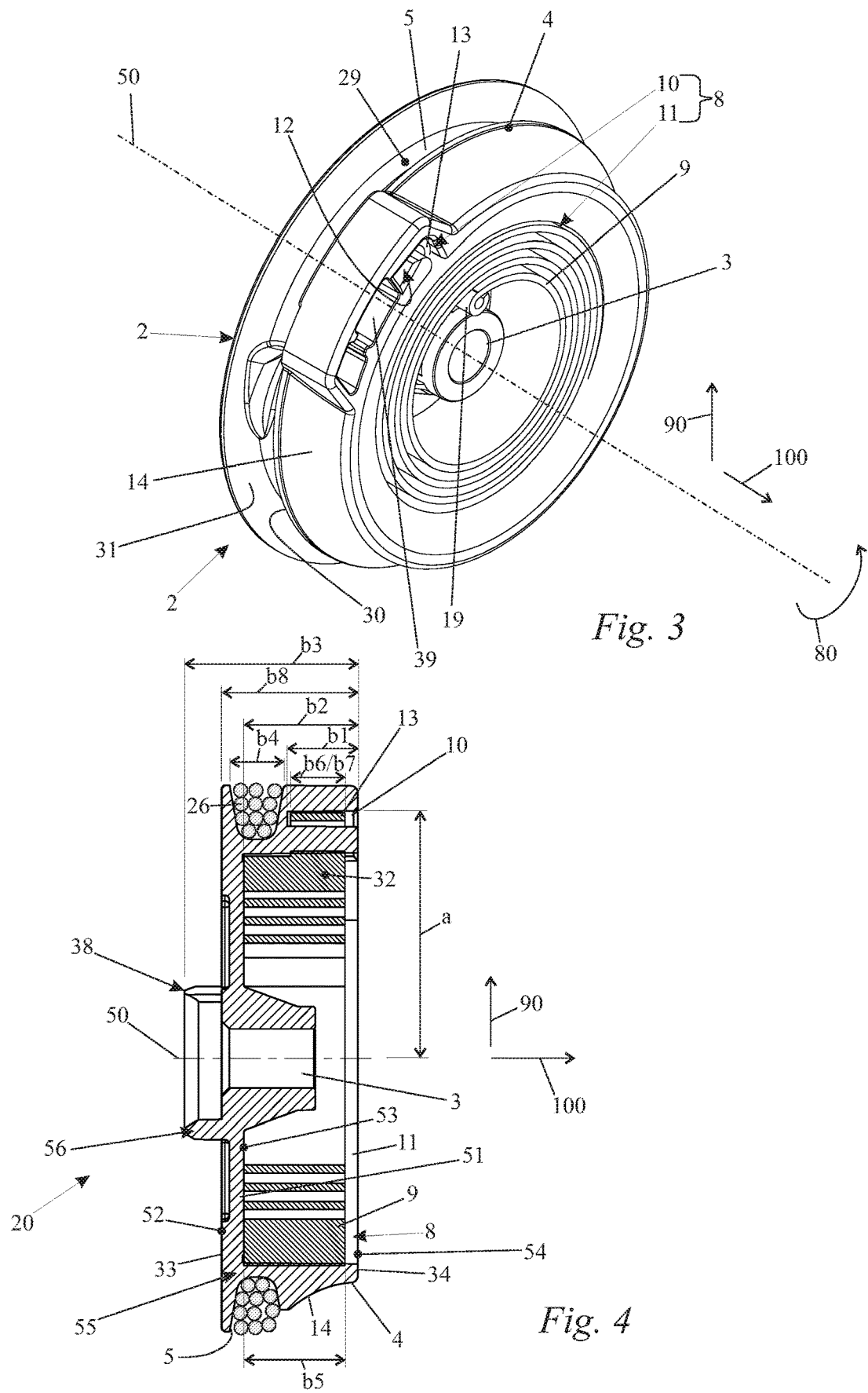

STARTER DEVICE, PULLEY ASSEMBLY FOR A STARTER DEVICE, AND CONNECTING SPRING FOR A PULLEY ASSEMBLY

BACKGROUND OF THE INVENTION

The invention relates to a pulley assembly for a starter device for starting an internal combustion engine of a hand-guided power tool, comprising a pulley and a connecting spring wherein a first end of the connecting spring is fixedly secured to the pulley, wherein the pulley comprises an axis of rotation extending in an axial direction, wherein the pulley comprises a circumferential recess that is provided at the external circumferential side in radial direction and configured to receive a starter rope, and wherein the pulley comprises a spring receptacle for receiving the connecting spring.

The invention further relates to a starter device comprising a pulley assembly and to a connecting spring for a pulley assembly.

US 2004/0177823 A1 discloses a starter device for starting an internal combustion engine. When starting the internal combustion engine, a pulley is caused to rotate by means of a starter rope. The pulley is connected to a damping spring by means of which the rotation energy of the pulley is transmitted to the crankshaft of an internal combustion engine.

SUMMARY OF THE INVENTION

The invention has the object to provide a pulley assembly with a compact configuration.

In accordance with the invention, this object is achieved in that the spring receptacle and the recess overlap each other viewed in the axial direction as well as viewed in the radial direction.

A further object of the invention resides in further developing a starter device with a pulley assembly in such a way that the starter device is of a compact configuration.

This object is solved by a starter device comprising a pulley assembly as claimed, wherein the starter device comprises a coupling device for connecting the pulley with a crankshaft of the internal combustion engine, wherein a second end of the connecting spring of the pulley assembly is fixedly connected to the coupling device.

A further object of the invention resides in further developing a connecting spring for a pulley assembly such that a compact configuration of the pulley assembly is enabled.

This object is solved by a connecting spring that has a width at its first end that is less than 100% of the maximum width of the connecting spring.

The pulley assembly according to the invention provides that the spring receptacle of the pulley and the circumferential recess for receiving a starter rope provided at the outwardly positioned circumferential side of the pulley are overlapping each other viewed in the axial direction of the axis of rotation as well as viewed in the radial direction of the axis of rotation. In this way, space can be saved in particular in the axial direction and/or the radial direction and the pulley assembly can be designed to have a compact configuration. The pulley assembly according to the invention for a starter device for starting an internal combustion engine of a hand-guided power tool can be configured such that it requires only minimal space in the hand-guided power tool; in this way, the hand-guided power tool can be designed to have a compact configuration. In this way, the hand-guided power tool can be easily guided and working with the hand-guided power tool is comfortable for the operator. Moreover, due to a more compact configuration in particular in radial direction, the cooling air supply to the internal combustion engine can be improved.

In an advantageous further embodiment of the invention, the spring receptacle comprises a spring chamber and a hooking region for connecting the connecting spring, wherein the hooking region of the spring receptacle and the recess for receiving the starter rope are arranged in axial direction at least partially adjacent to each other. In this way, the first end of the connecting spring, when hooked in the hooking region, is arranged radially far outwardly. Upon rotation of the pulley about its axis of rotation, a great torque can be transmitted from the pulley to the connecting spring in this way. Moreover, the expansion of the spring receptacle, in particular of the spring chamber, in the radial direction can be large. In this way, large connecting springs can be installed. Such springs can transmit great forces. Since the recess of the pulley begins already, relative to the radial direction, inwardly in the spring receptacle and not, as is common in the prior art, only radially outwardly of the spring receptacle, it is possible for the same pulley diameter to accommodate more starter rope on the pulley. Therefore, it is possible to reduce the pulley diameter and to keep the rope volume that is to be accommodated constant.

Due to the reduction of the pulley diameter, air can penetrate better into the starter housing and better cool the internal combustion engine. Expediently, the spring receptacle overlaps the recess, viewed in the axial direction, exclusively with the hooking region.

In particular, the hooking region of the spring receptacle has a width measured in the axial direction. In particular, the spring chamber of the spring receptacle has a width measured in the axial direction. Advantageously, the width of the hooking region is less than 100%, in particular less than 70%, preferably less than 65%, of the width of the spring chamber. In this way, the connecting spring with its hooking region can be arranged in a space-saving way in the axial direction adjacent to the recess for receiving the starter rope and still have a sufficient width for ensuring the required stability of the connecting spring.

In particular, the pulley has a maximum width measured in the axial direction. Advantageously, a width of the recess for receiving the starter rope that is measured at the circumferential side of the pulley in the axial direction amounts to at least 15%, in particular at least 25%, of the maximum width of the pulley. In this way, the recess has sufficient space for accommodating the starter rope in the axial direction.

In an advantageous further embodiment of the invention, the connecting spring is hooked with the first end in the hooking region of the spring receptacle and comprises a maximum width measured in the axial direction. A width of the connecting spring measured in the axial direction at its first end is advantageously less than 100%, in particular less than 75%, preferably less than 65%, of the maximum width of the connecting spring. In this way, it is possible to accommodate the first end of the connecting spring in a space-saving way in a hooking region that is comparatively small in the axial direction and to configure the spring at the same time to be sufficient stable. It has been found that spring breakage of the connecting spring in general occurs remote from their ends. For this reason, the first end of the connecting spring can be configured to be more narrow and the connecting spring can be configured between its ends with a sufficient width for a high stability.

Expediently, the first end of the connecting spring is narrower than the maximum width of the connecting spring within an angle range of at least 5°, preferably of at least 10°, in particular of at least 15°, in the circumferential direction about the axis of rotation. The term "first end of the connecting spring" refers presently to an end region of the connecting spring which extends across an angle region of the spring and does not refer only to a discrete point. Due to the narrower configuration of the connecting spring at its first end, a hooking projection at the first end of the connecting spring can be configured to be sufficiently long in the circumferential direction in order to produce a safe connection to the pulley and, at the same time, occupy little space in the axial direction.

In an advantageous further embodiment of the invention, the pulley comprises an air guiding contour at its circumferential side. Typically, the pulley assembly is arranged on the crankshaft of an internal combustion engine such that, between the pulley assembly and a cylinder of the internal combustion engine, a fan wheel for conveying cooling air to the cylinder is arranged. When conveying the cooling air to the cylinder, the air flows past the pulley assembly on its path from the outer side of the hand-guided power tool to the cylinder of the internal combustion engine. Due to the air guiding contour, the course of the air flow can be positively affected. The flow resistance can be reduced and the cooling air can be guided past the pulley. Preferably, the air guiding contour is designed such that the cooling air flow cannot reach components that are sensitive to soiling such as, for example, the connecting spring.

Expediently, the air guiding contour of the pulley is concave in a section view along the axis of rotation. In this way, on the one hand, the air can be guided better to the fan wheel and to the cylinder and, on the other hand, the connecting spring of the pulley assembly can be protected from introduction of contaminants through the cooling air.

Advantageously, the connecting spring is a spiral spring.

Expediently, the recess extends precisely once about the axis of rotation of the pulley.

In particular, the spring chamber has a rear wall. Advantageously, the connecting spring has a spacing, measured in the axial direction, relative to the rear wall which is less than 25% of the maximum width of the connecting spring. Expediently, the connecting spring is contacting the rear wall.

The rear wall of the spring chamber comprises an exterior side which is facing away from the connecting spring. The spring chamber comprises an opening through which the connecting spring can be inserted into the spring chamber. The pulley comprises a base body with a base body width measured in the axial direction from the exterior side of the rear wall all the way to the opening. In an advantageous embodiment of the invention, the maximum width of the connecting spring amounts to at least 80%, in particular at least 90% of the base body width.

In a starter device according to the invention with a pulley assembly, it is provided that the starter device comprises a coupling device for connecting the pulley with a crankshaft of the internal combustion engine and that a second end of the connecting spring of the pulley assembly is connected fixedly to the coupling device.

Advantageously, the coupling device is a follower. Advantageously, the follower covers the spring chamber in the axial direction completely. In this way, the spring chamber and in particular the connecting spring can be protected from contaminants, in particular from contaminants contained in the cooling air flow. In this way, the connecting spring is less prone to failure and requires substantially no servicing.

In an advantageous further embodiment of the invention, it is provided that the coupling device comprises coupling elements configured to couple the starter device with the crankshaft of the internal combustion engine, that the follower comprises an air guiding collar and that the air guiding collar is arranged on a side of the follower that is facing away from the connecting spring in the axial direction. Advantageously, the air guiding collar is arranged radially outwardly relative to the coupling elements. In this way, the air guiding collar can protect the coupling elements from contaminants contained in the cooling air flow. This enables a substantially disturbance-free coupling of the follower by means of its coupling elements to the crankshaft of the internal combustion engine.

Expediently, the air guiding collar, at least in a section thereof, is conically shaped in a section view along the axis of rotation. In this way, the cooling air flow can be conveyed in a particularly advantageous way to the fan wheel.

The width of the connecting spring according to the invention at its first end is less than 100%, in particular less than 75%, preferably less than 65%, of the maximum width of the connecting spring. As already disclosed above, the connecting spring in this way is stable and, at the same time, can be connected in a space-saving way to the pulley.

BRIEF DESCRIPTION OF THE DRAWING

FIG. 3 is a perspective illustration of a pulley assembly of the starter device according to FIG. 1.

FIG. 4 is a section view of the pulley assembly of FIG. 3 with starter rope.

DESCRIPTION OF THE PREFERRED EMBODIMENTS

Figure 11:
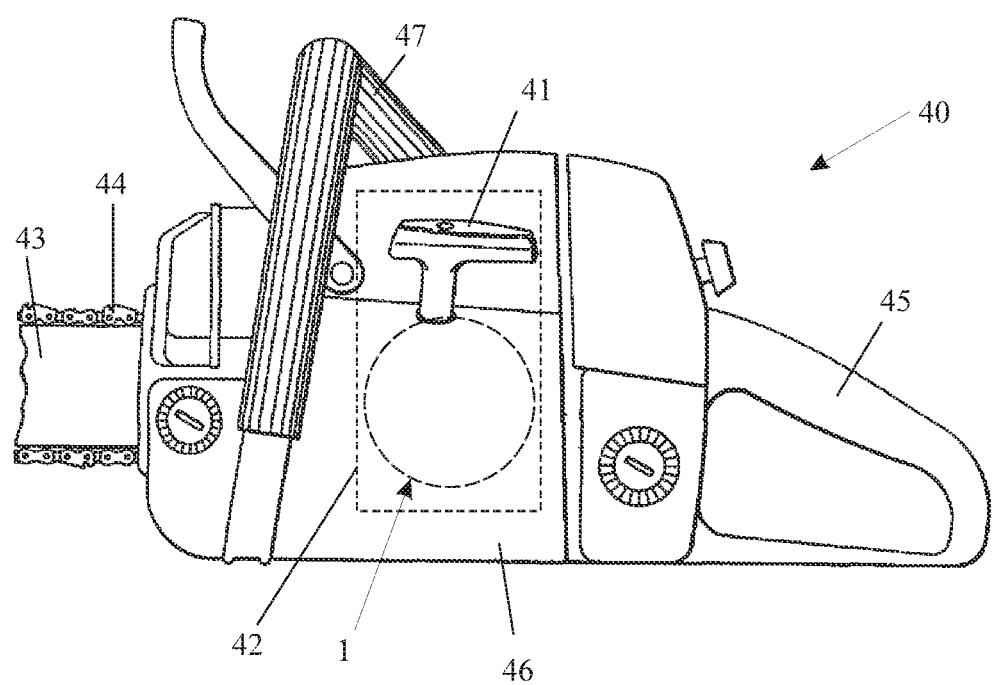
FIG. 11 is a schematic illustration of a hand-guided power tool with a starter device.

FIG. 11 shows a hand-guided power tool 40, in the embodiment a motor chainsaw. The hand-guided power tool can also be a different hand-guided power tool, for example, a blower, a trimmer, a cut-off machine or the like. The power tool 40 comprises a housing 46 in which a schematically illustrated internal combustion engine 42 is arranged. The internal combustion engine 42 is preferably a single cylinder engine, in particular a two-stroke engine, or a mixture-lubricated four-stroke engine. The internal combustion engine 42 serves for driving a tool member. In the embodiment, the tool member is a saw chain 44 circulating about a guide bar 43. For guiding the power tool 40, a handle 45 as well as a tubular grip 47 are provided. For starting the internal combustion engine 42, a starter device 1 is provided which is also schematically illustrated in FIG. 11. The starter device 1 is preferably a rope starter to be actuated by hand. The starter device 1 comprises for this purpose a starter handle 41 which projects from the housing 46 of the power tool 40.

Figure 1:
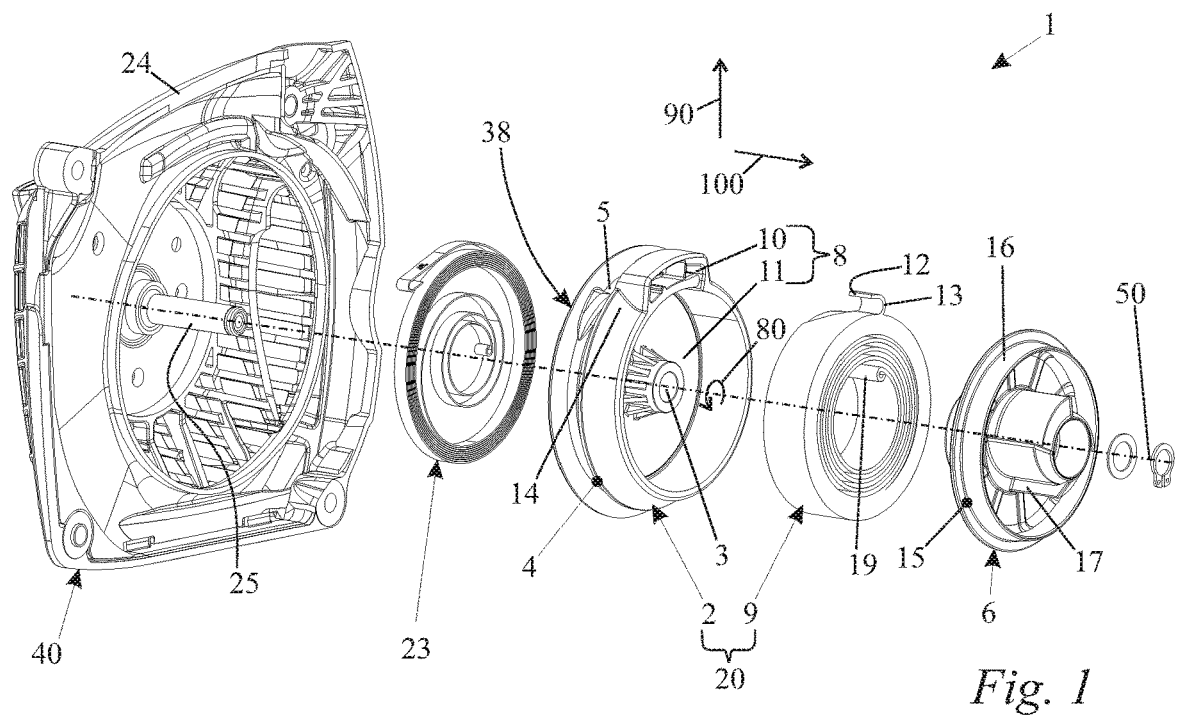
FIG. 1 is an exploded view of a starter device.

In FIG. 1, the starter device 1 is illustrated in detail. The starter device 1 comprises a starter housing 24, a return spring 23, a pulley assembly 20, and a coupling device 6. The starter housing 24 forms advantageously a part of the housing 46 of the hand-guided power tool 40.

The pulley assembly 20 is comprised of a pulley 2 and a connecting spring 9. The starter housing 24 comprises a bearing pin 25. The pulley 2 and the coupling device 6 are rotatably supported on the bearing pin 25. For this purpose, the pulley 2 has a hub 3. The bearing pin 25 is pushed through the hub 3. The pulley 2 is connected by the return spring 23 with the starter housing 24. The return spring 23 is a spiral spring in the embodiment. The return spring 23 is arranged between the starter housing 24 and the pulley 2 in a return spring receptacle 38 of the pulley 2; one end of the return spring 23 is fixedly connected to the starter housing 24 and the other end is fixedly connected to the pulley 2. The other end of the return spring 23 is arranged in the return spring receptacle 38. The pulley 2 is connected by means of the connecting spring 9 to the coupling device 6. The connecting spring 9 is a spiral spring. The connecting spring 9 is arranged between the pulley 2 and the coupling device 6 in a spring receptacle 8 of the pulley 2. The connecting spring 9 is arranged on the side of the pulley 2 which is facing away from the starter housing 24.

Figure 2:
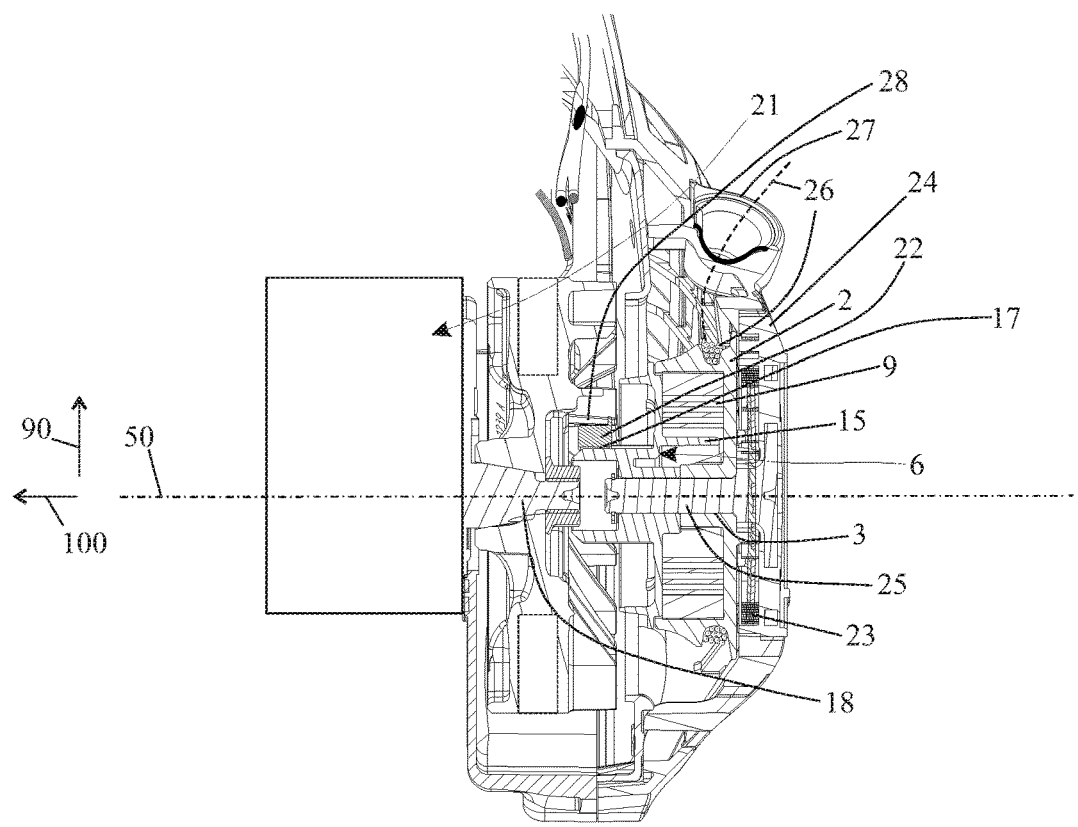
FIG. 2 is a schematic detail illustration of a section view of the starter device of FIG. 1 in a power tool.

The starter device 1 serves for starting the internal combustion engine 21 illustrated schematically in FIG. 2. A starter rope 26, illustrated in FIG. 2, is wound onto the pulley 2. A first end of the starter rope 26 is secured to the pulley 2. A second end of the starter rope 26 is extending through a starter socket 27 of the starter housing 24 out of the starter housing 24. For starting the internal combustion engine 21, the operator pulls at the starter handle 41 (FIG. 11) secured at the second end of the starter rope 26. Pulling the starter rope 26 causes the pulley 2 to rotate about an axis of rotation 50. In doing so, the pulley 2 rotates about the bearing pin 25. The axis of rotation 50 extends in an axial direction 100. The axial direction 100 extends from the return spring receptacle 38 of the pulley 2 in the direction of the spring receptacle 8 for receiving the connecting spring 9. The axial direction 100 extends from the pulley 2 in the direction toward the connecting spring 9. A radial direction 90 extends perpendicular to the axis of rotation 50. The rotation energy of the pulley 2 is transmitted by the connecting spring 9 to the coupling device 6. The connecting spring 9 serves in this context for damping jerky and erratic pulling movements. It can also be provided that the connecting spring serves for intermediate storage of energy so that the connecting spring can be tensioned first by several starter strokes at the starter rope before the connecting spring transmits its stored energy through the coupling device to the crankshaft. In this case, the connecting spring is typically connected by a freewheel action to the pulley.

The coupling device 6 comprises coupling elements 17. In the embodiment, the coupling device 6 is a follower 15. The coupling elements 17 are embodied as locking projections at the circumferential region of the follower 15. It can also be provided that the coupling elements of the coupling device of the starter device are pawls.

The internal combustion engine 21 comprises a crankshaft 18. A fan wheel 28 is fixedly connected to the crankshaft 18. The fan wheel 28 engages across the coupling elements 17 of the coupling device 6 of the starter device 1 with a cup-shaped projection. Coupling elements 22 of the crankshaft 18 are pivotably supported at this cup-shaped projection. The coupling elements 22 of the crankshaft 18 are pawls in the embodiment. However, it can also be provided that the coupling elements of the crankshaft are locking projections or something similar. In the embodiment, the coupling elements 22 of the crankshaft 18 are pretensioned by springs in the direction toward the coupling elements 17 of the coupling device 6 of the starter device 1.

When pulling the starter rope 26, the coupling device 6 of the starter device 1 is caused to rotate and entrains by means of the coupling elements 17 of the coupling device 6, embodied as looking projections, the coupling elements 22 of the crankshaft 18 that are embodied as pawls. In this way, the fan wheel 28 and thus the crankshaft 18 are caused to rotate. When the crankshaft 18 rotates faster than the follower 15, the coupling elements 22 lose contact with the coupling elements 17 of the starter device 1 embodied as locking projections. At this point in time, the starting process is already terminated and the crankshaft 18 is driven by the internal combustion engine 21.

The rotation of the pulley 2 during the starting stroke also tensions the return spring 23. After completion of a starting stroke, the pulley 2 is caused to rotate by the return spring 23 opposite to its rotation direction when pulling the starter rope 26 and the starter rope 26 is then wound again onto the pulley 2.

FIG. 3 shows the pulley assembly 20. The connecting spring 9 of the pulley assembly 20 is connected with a first end 12 fixedly to the pulley 2 of the pulley assembly 20. For this purpose, the connecting spring 9 has at its first end 12 a hooking projection 13. The term "first end" in this context means a certain region relative to a circumferential direction 80. The circumferential direction 80 extends in the direction about the axis of rotation 50.

Figure 6:
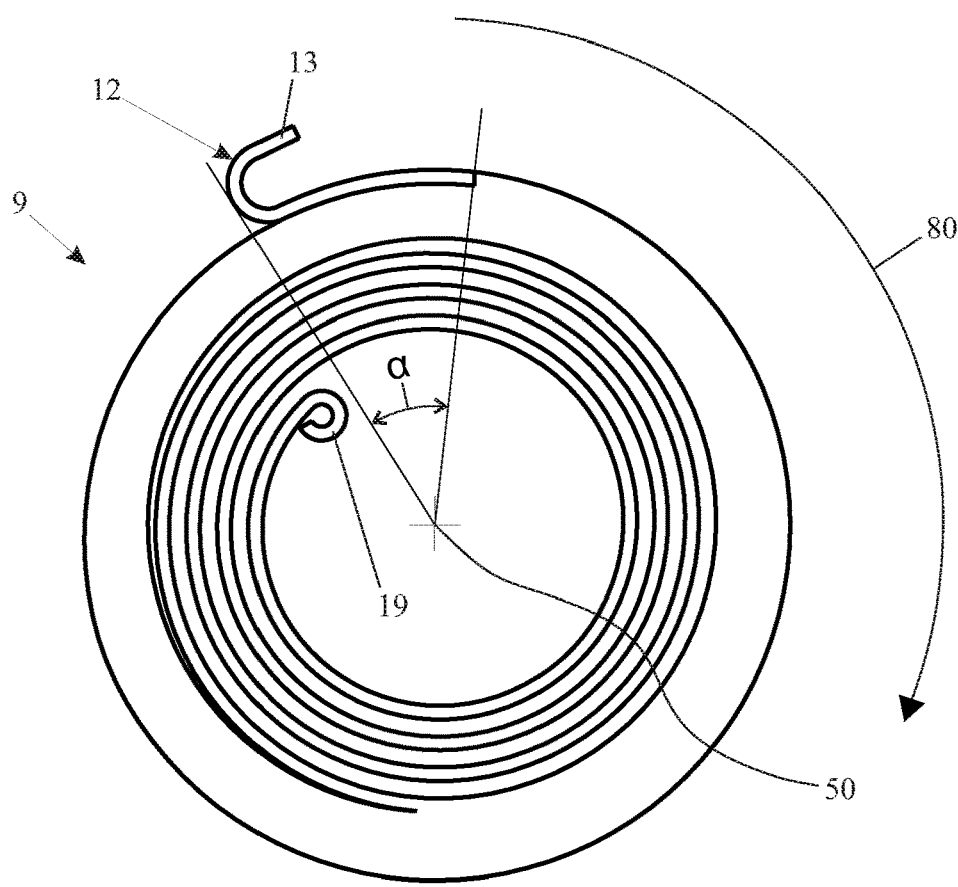
FIG. 6 is a side view of the connecting spring according to FIG. 5.

The pulley 2 comprises the spring receptacle 8 for receiving the connecting spring 9. The spring receptacle 8 comprises a spring chamber 11 and a hooking region 10. The hooking region 10 of the spring receptacle 8 serves for connecting the pulley 2 with the connecting spring 9. The hooking region 10 is farther removed from the axis of rotation 50 than the spring chamber 11 in the radial direction 90. As illustrated in FIG. 3, the connecting spring 9 is hooked with its hooking projection 13 in the hooking region 10 of the spring receptacle 8 of the pulley 2. The hooking projection 13 is also illustrated in FIG. 1. In the embodiment, the hooking projection 13 is bent opposite to the winding direction of the connecting spring 9, i.e., in the circumferential direction 80. The hooking projection 13 forms a part of the first end 12 of the connecting spring 9. The connecting spring 9 comprises a base body 32 and a hooking projection 13. The first end of the connecting spring 9 is positioned outwardly in the radial direction 90. In the embodiment, the hooking projection 13 is designed in a U-shape in a view in the axial direction 100. This is also illustrated in FIG. 6. The hooking projection 13 can also be angled away from the base body 32 in a different shape. As can be seen in FIGS. 1 and 3, the shape of the hooking region 10 of the spring receptacle 8 is matched to the shape of the hooking projection 13 of the connecting spring 9. Accordingly, the shape of the hooking region 10 of the spring receptacle 8 in a view opposite to the axial direction 100 is substantially L-shaped. In the circumferential direction 80, a receptacle 39 for a knot at the first end of the starter rope 26 is provided adjacent to the hooking region 10. The knot of the starter rope 26 and the hooking projection 13 of the connecting spring 9 have substantially the same radial spacing relative to the axis of rotation 50.

As illustrated in FIG. 1, the connecting spring 9 comprises a second end 19. The second end 19 of the connecting spring 9 is positioned inwardly in the radial direction 90. The second end 19 of the connecting spring 9 of the pulley assembly 20 is fixedly connected to the coupling device 6. For this purpose, the follower 15 comprises a receptacle, not illustrated, for the second end 19; the receptacle has a commonly used design known in the art.

As illustrated in FIG. 3, the pulley 2 comprises a circumferential recess 5 at its outwardly positioned circumferential side 4 in the radial direction 90; the circumferential recess 5 is configured for receiving the starter rope 26. The recess 5 comprises a recess bottom 29 and recess sidewalls 30 and 31 which are positioned opposite each other in the axial direction. The recess 5 extends completely about the axis of rotation 50. The recess 5 extends precisely once about the axis of rotation 50 of the pulley 2.

FIG. 4 shows a section view of the pulley assembly 20 with starter rope 26 wound onto the pulley 2. The section plane comprises the axis of rotation 50 of the pulley 2 and the hooking projection 13 of the connecting spring 9. The spring receptacle 8 and the recess 5 overlap each other, viewed in the axial direction 100 as well as viewed in the radial direction 90. The recess 5 and the spring receptacle 8 are positioned in a common first plane which extends perpendicular to the axis of rotation 50. The recess 5 and the spring receptacle 8 are positioned in a common second plane which extends perpendicular to the radial direction 90. The first plane and the second plane are positioned perpendicular relative to each other. The spring receptacle 8 and the recess 5 are arranged in the axial direction 100 at the same level and are arranged in the radial direction 90 at the same level.

The hooking region 10 of the spring receptacle 8 and the recess 5 for receiving the starter rope 26 overlap each other viewed in the axial direction 100. The hooking region 10 and the recess 5 are at least partially adjacently positioned in the axial direction 100. The spring receptacle 8 overlaps the recess 5 viewed in the axial direction 100 exclusively with the hooking region 10. The spring chamber 11 and the recess 5 overlap each other viewed in the radial direction 90. Spring chamber 11 and recess 5 are arranged in the radial direction 90 at least partially adjacent to each other.

The hooking region 10 comprises a width b1 measured in the axial direction 100. The spring chamber 11 comprises a width b2 measured in the axial direction 100. The width b1 of the hooking region 10 is smaller than the width b2 of the spring chamber 11. The width b1 of the hooking region 10 is less than 70% of the width b2 of the spring chamber 11. In the embodiment, the width b1 of the hooking region 10 is less than 65% of the width b2 of the spring chamber 11.

The pulley 2 comprises a maximum width b3 measured in the axial direction 100. The recess 5 comprises a width b4 measured at the circumferential side 4 of the pulley 2 in the axial direction. The width b4 of the recess 5 amounts to at least 15% of the maximum width b3 of the pulley 2. In the embodiment, the width b4 of the recess 5 amounts to at least 25% of the maximum width b3 of the pulley 2.

The width b1 of the hooking region 10 amounts to at least 25% of the maximum width b3 of the pulley 2.

The connecting spring 9 comprises a maximum width b5 measured in the axial direction 100. The first end 12 of the connecting spring 9 comprises a width b6 measured in the axial direction 100. In the embodiment, the width b6 of the connecting spring 9 at its first end 12 is measured in the region of the hooking projection 13. The width b6 of the connecting spring 9 at its first end 12 is smaller than the maximum width b5 of the connecting spring 9. The width b6 of the connecting spring 9 at its first end 12 in the region of the hooking projection 13 is less than 75% of the maximum width b5 of the connecting spring 9. In the embodiment, the width b6 of the connecting spring 9 at its first end 12 in the region of the hooking projection 13 is less than 65% of the maximum width b5 of the connecting spring 9.

The hooking projection 13 comprises a measured width b7 measured in the axial direction 100. The width b7 of the hooking projection 13 is smaller than the maximum width b5 of the connecting spring 9. The width b7 of the hooking projection 13 is less than 75% of the maximum width b5 of the connecting spring 9. In the embodiment, the width b7 of the hooking projection 13 is less than 65% of the maximum width b5 of the connecting spring 9.

As illustrated in FIG. 6, the connecting spring 9 is advantageously narrower than the maximum width b5 of the connecting spring 9 in an angle range a of at least 5° in the circumferential direction 80 about the axis of rotation 50. In the embodiment, the connecting spring 9 is narrower than the maximum width b5 of the connecting spring 9 in the angle range a of at least 10° in the circumferential direction 80.

As illustrated in FIG. 4, the connecting spring 9 comprises a greatest radial expansion a that is measured in the radial direction 90 beginning at the axis of rotation 50. When looking at FIGS. 1 and 4 together, it is apparent that the hooking projection 13 in the radial direction 90 extends across at least 10% of the longest radial expansion a of the connecting spring 9. In the embodiment, the hooking projection 13 extends in the radial direction 90 across at least 15% of the longest radial expansion a of the connecting spring 9.

As illustrated in FIG. 4, the hooking projection 13 of the connecting spring 9 is arranged adjacent to the starter rope 26 in the axial direction 100. In addition to the hooking projection 13, the connecting spring 9 comprises the base body 32. The base body 32 is positioned in the radial direction 90 closer to the axis of rotation 100 than the hooking projection 13. The base body 32 of the connecting spring 9 is arranged in the spring chamber 11 of the spring receptacle 8. The recess 5 extends circumferentially about the base body 32 of the connecting spring 9. The recess 5 surrounds the base body 32 of the connecting spring 9. The base body 32 of the connecting spring 9 and the starter rope 26 in the recess 5 are positioned adjacent to each other in the radial direction 90.

As illustrated in FIG. 4, the pulley 2 comprises an air guiding contour 14 at its circumferential side 4. The circumferential side 4 of the pulley 2 extends in the circumferential direction 80 about the axis of rotation 50. The air guiding contour 14 is advantageously of a concave configuration viewed in a section view along the axis of rotation 50. This means that the air guiding contour 14 in a view from outside of the pulley 2 in the direction perpendicular to the axis of rotation 50 is concave. The air guiding contour, in a view from outside of the pulley 2, is concave opposite to the radial direction 90.

The pulley 2 comprises in the axial direction 100 a first outer surface 33 and a second outer surface 34. The first outer surface 33 and the second outer surface 34 form end faces of the pulley 2 facing away from each other relative to the axial direction 100. The spring chamber 11 of the pulley 2 comprises a rear wall 51. The rear wall 51 delimits the spring chamber 11 in the direction opposite to the axial direction 100. The rear wall 51 comprises an outer side 52. The outer side 52 is arranged at the side of the rear wall 51 which is facing the return spring receptacle 38. The outer side 52 of the rear wall 51 is a component of the first outer surface 33 of the pulley 2. The rear wall 51 comprises an inner side 53. The inner side 53 is positioned at the side of the rear wall 51 which is facing away from the return spring receptacle 38. The first outer surface 33 is facing away from the connecting spring 9. The second outer surface 34 is facing away from the first outer surface 33 and arranged at the side where the connecting spring 9 is located. The second outer surface 34 is positioned in the axial direction 100 adjacent to the hooking region 10 of the spring receptacle 8 and the first outer surface 33 is positioned in the axial direction 100 adjacent to the recess 5 of the pulley 2. The second outer surface 34 is positioned at the side of the rear wall 51 which is facing away from the return spring receptacle 38. The spring chamber 11 comprises an opening 54. Through the opening 54, the connecting spring 9 can be introduced into the spring chamber 11. The opening 54 of the spring chamber 11 extends in the same plane as the second outer surface 34 of the pulley 2.

The connecting spring 9 comprises a spacing to the rear wall 51 of the spring chamber 11 which is measured in the axial direction and which is less than 25% of the maximum width b5 of the connecting spring 9 measured in the axial direction 100. In the embodiment, the connecting spring 9 is contacting the inner side 53 of the rear wall 51.

The pulley 2 comprises a base body 55. The pulley 2 comprises a socket 56 for connection with the bearing pin 25 illustrated in FIG. 1. The socket 56 projects in the direction opposite to the axial direction 100 past the base body 55. The outer side 52 of the rear wall 51 of the spring chamber 11 adjoins the socket 56 in the axial direction 100. The outer side 52 of the rear wall 51 extends in a plane which extends perpendicular to the axis of rotation 50. The socket 52 comprises the return spring receptacle 38.

The pulley 2 comprises a base body width b8. The base body width b8 is measured in the axial direction 100 beginning at the outer side 52 of the rear wall 51 all the way to the opening 54 of the spring chamber 11. The maximum width b5 of the connecting spring 9 measured in the axial direction 100 amounts to at least 80%, in particular at least 90%, of the base body width b8.

The air guiding contour 14 extends in the circumferential side 4 of the pulley 2 all the way to the second outer surface 34 of the pulley 2. The air guiding contour 14 of the pulley 2 extends almost completely about the axis of rotation 50. As illustrated in FIG. 3, the air guiding contour 14 in the circumferential direction 80 is only interrupted by the hooking region 10 of the spring receptacle 8 and the receiving space 39 for the knot of the starter rope 26. The hooking region 10 and the receiving space 39 are positioned in the circumferential direction 80 immediately adjacent to each other and form a common circumferential section. The air guiding contour 14 in the circumferential direction 80 is only interrupted at this one common circumferential section.

Figure 5:
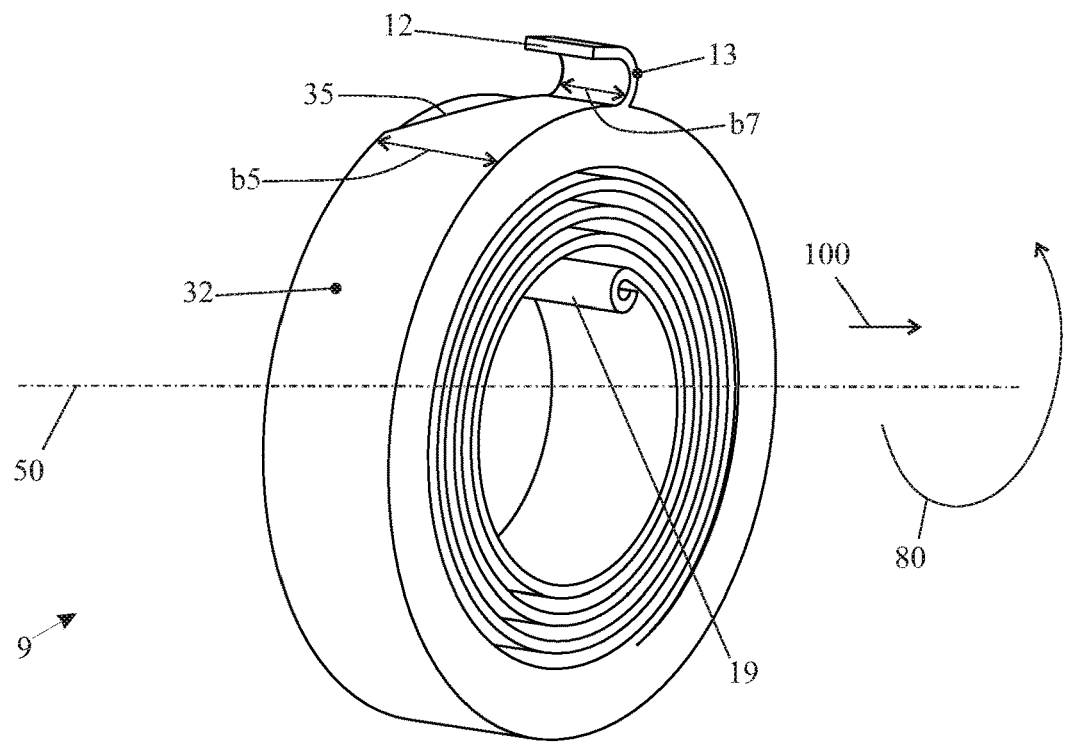
FIG. 5 is a perspective illustration of a connecting spring of the pulley assembly according to FIG. 1.
Figure 10:
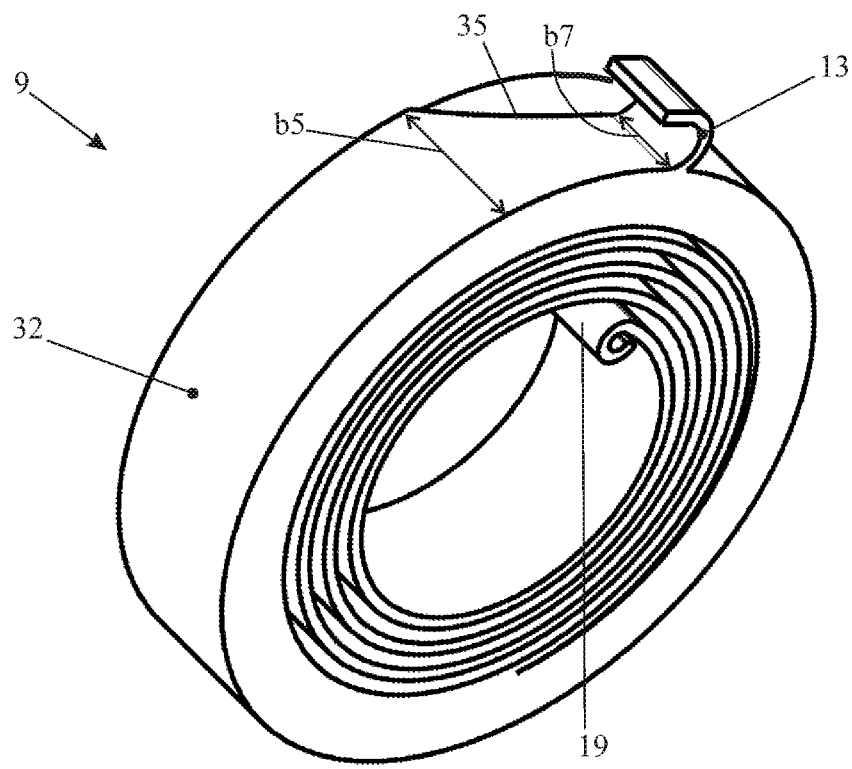
FIG. 10 is a perspective illustration of a connecting spring of the pulley assembly of FIG. 1.

FIGS. 5 and 10 show the connecting spring 9 in a schematic perspective illustration. When looking at FIGS. 5 and 6 together, it is apparent that in the embodiment the connecting spring 9 in the region of its base body 32 comprises the maximum width b5, with the exception of its angle range a. At its first end 12, between the region of the base body 32 with maximum width b5 and the hooking projection 13, the connecting spring 9 comprises a transition surface 35. Relative to the circumferential direction 80, the width of the connecting spring 9 increases in the region of the transition surface 35, beginning at the hooking projection 13 all the way to the region of the base body 32 of the connecting spring 9 with maximum width b5. In particular, the width of the connecting spring 9 continuously increases in the region of the transition surface 35. The increase can be linear or non-linear. In the embodiment, the increase is non-linear, as is illustrated in FIG. 10. The transition surface 35 connects the region of the base body 32 of the connecting spring 9 with maximum width b5 to the hooking projection 13 of the connecting spring 9. It can be expedient to provide also a change of the width of the connecting spring 9 at the inner second end 19 of the connecting spring 9.

Figure 7:
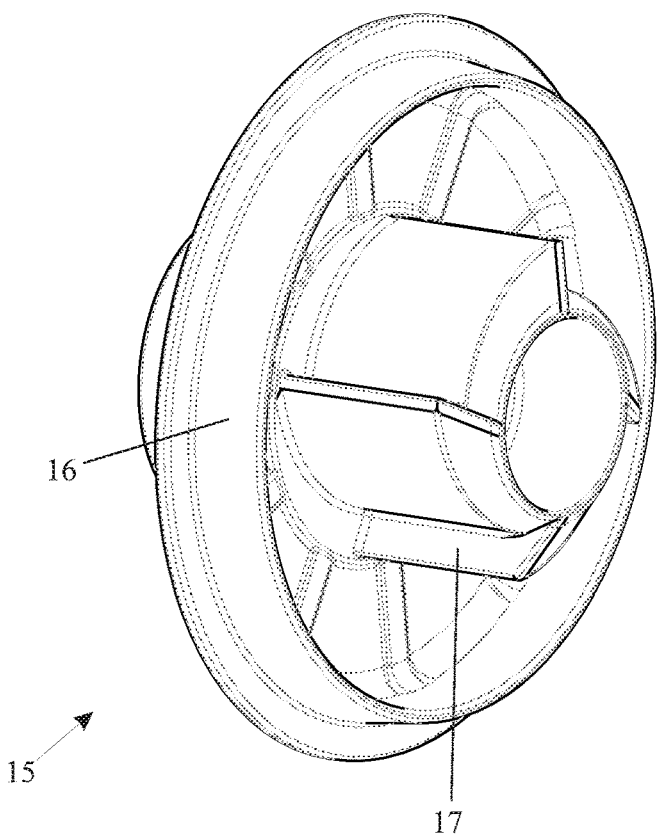
FIG. 7 is a perspective illustration of a follower of the starter device according to FIG. 1.

FIG. 7 shows the follower 15 in a perspective illustration. The follower 15 comprises an air guiding collar 16. As illustrated in FIG. 1, the air guiding collar 16 is arranged at the side of the follower 15 which is facing away from the connecting spring 9. The air guiding collar 16 is arranged outwardly relative to the coupling elements 17 in the radial direction 90.

Figure 8:
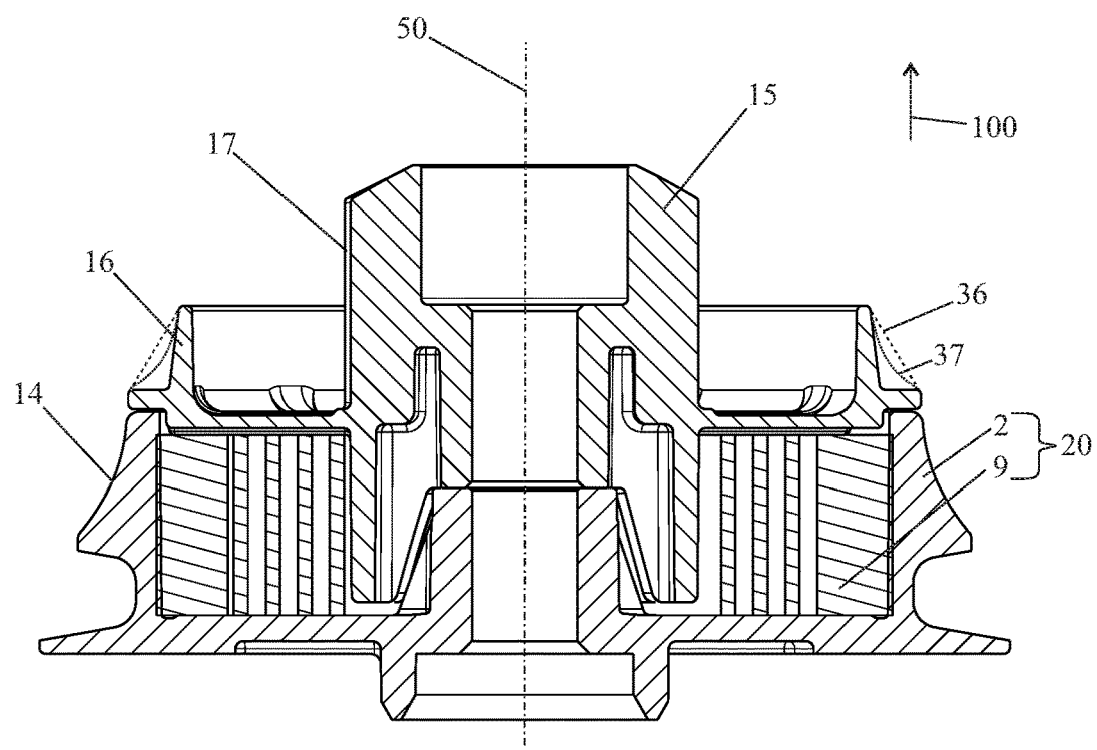
FIG. 8 is a schematic illustration of a section of the pulley assembly and the follower of FIG. 1.

FIG. 8 shows a section of the pulley assembly 20 with the follower 15 arranged on the pulley assembly 20. The section plane comprises the axis of rotation 50. The contour 36 of the air guiding collar 16 is indicated by dashed line. The contour 36 of the air guiding collar 16 extends in a section view along the axis of rotation 50 in a conical shape. In this context, the follower 15 tapers in the axial direction 100. It can also be provided that the contour of the air guiding collar in a section view along the axis of rotation 50 extends at least in a section thereof in a concave shape. Such a course of extension is indicated by dashed line in FIG. 8 and identified by reference character 37.

Figure 9:
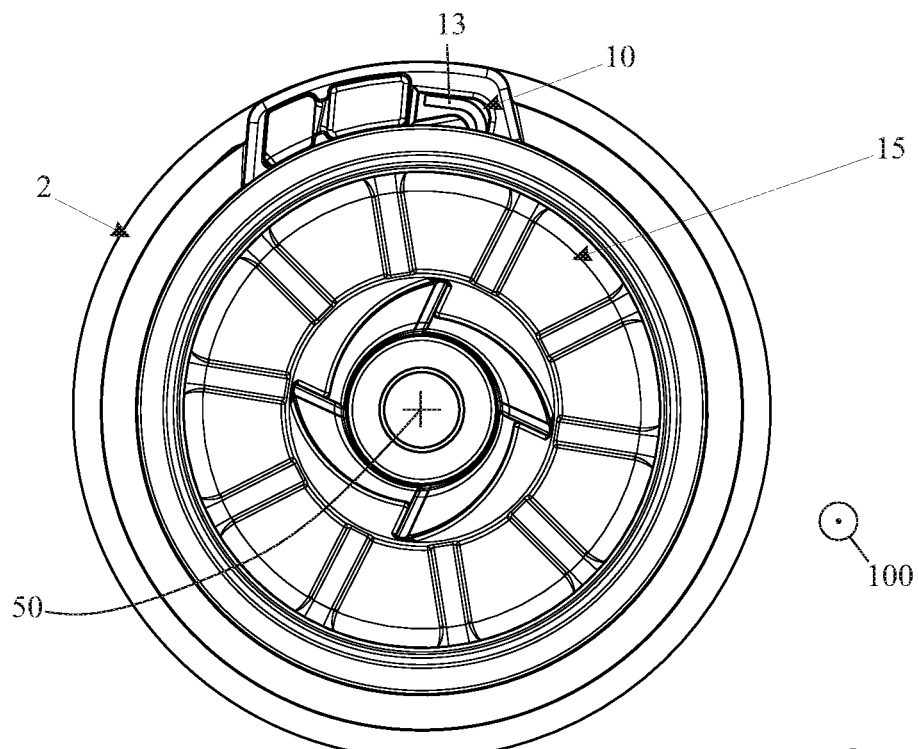
FIG. 9 is a side view of the pulley assembly and the follower of FIG. 8.

The follower 15 completely covers the spring chamber 11 of the spring receptacle 8, viewed in the axial direction 100. The hooking region 10 of the spring receptacle 8 projects advantageously at least partially in the radial direction 90 past the follower 15. This is also illustrated in FIG. 9.

The specification incorporates by reference the entire disclosure of European priority document 19 162 190.3 having a filing date of Mar. 12, 2019.

While specific embodiments of the invention have been shown and described in detail to illustrate the inventive principles, it will be understood that the invention may be embodied otherwise without departing from such principles.

What is claimed is:

1. A pulley assembly for a starter device for starting an internal combustion engine of a hand-guided power tool, the pulley assembly comprising:
   a pulley comprising an axis of rotation extending in an axial direction and further comprising a circumferential side, the circumferential side positioned outwardly in a radial direction relative to the axis of rotation;
   the pulley comprising a circumferential recess arranged at the circumferential side and configured to accommodate a starter rope, wherein the circumferential recess extends precisely only once about the axis of rotation;
   the pulley comprising a spring receptacle;
   a connecting spring disposed in the spring receptacle and comprising a first end fixedly connected to the pulley;
   the spring receptacle and the circumferential recess overlapping each other, viewed in the axial direction and viewed in the radial direction.

2. A pulley assembly for a starter device for starting an internal combustion engine of a hand-guided power tool, the pulley assembly comprising:

a pulley comprising an axis of rotation extending in an axial direction and further comprising a circumferential side, the circumferential side positioned outwardly in a radial direction relative to the axis of rotation;

the pulley comprising a circumferential recess arranged at the circumferential side and configured to accommodate a starter rope;

the pulley comprising a spring receptacle;

a connecting spring disposed in the spring receptacle and comprising a first end fixedly connected to the pulley;

the spring receptacle and the circumferential recess overlapping each other, viewed in the axial direction and viewed in the radial direction;

wherein the spring receptacle comprises a spring chamber and a hooking region configured to connect the connecting spring to the pulley, wherein the hooking region and the circumferential recess are arranged at least partially adjacent to each other in the axial direction;

wherein, viewed in the axial direction, the spring receptacle overlaps the circumferential recess exclusively with the hooking region.

3. The pulley assembly according to claim 2, wherein the hooking region has a width measured in the axial direction, wherein the spring chamber has a width measured in the axial direction, wherein the width of the hooking region amounts to less than 100% of the width of the spring chamber.

4. The pulley assembly according to claim 3, wherein the pulley comprises a maximum width measured in the axial direction and wherein the circumferential recess has a width, measured at the circumferential side of the pulley in the axial direction, that amounts to at least 15% of the maximum width of the pulley.

5. The pulley assembly according to claim 2, wherein the first end of the connecting spring is hooked in the hooking region to the pulley, wherein the connecting spring comprises a maximum width measured in the axial direction and wherein the first end of the connecting spring comprises a width measured in the axial direction that amounts to less than 100% of the maximum width of the connecting spring.

6. The pulley assembly according to claim 5, wherein the first end of the connecting spring is narrower than the maximum width of the connecting spring in an angle range of at least 5° in a circumferential direction about the axis of rotation.

7. The pulley assembly according to claim 1, wherein the pulley comprises an air guiding contour at the circumferential side.

8. The pulley assembly according to claim 7, wherein the air guiding contour is concave in a section view along the axis of rotation.

9. The pulley assembly according to claim 1, wherein the connecting spring is a spiral spring.

10. The pulley assembly according to claim 1, wherein the spring receptacle comprises a spring chamber, wherein the spring chamber comprises a rear wall, and wherein the connecting spring comprises a spacing relative to the rear wall that is measured in the axial direction and amounts to less than 25% of a maximum width of the connecting spring.

11. A pulley assembly for a starter device for starting an internal combustion engine of a hand-guided power tool, the pulley assembly comprising:

a pulley comprising an axis of rotation extending in an axial direction and further comprising a circumferential side, the circumferential side positioned outwardly in a radial direction relative to the axis of rotation;

the pulley comprising a circumferential recess arranged at the circumferential side and configured to accommodate a starter rope;

the pulley comprising a spring receptacle;

a connecting spring disposed in the spring receptacle and comprising a first end fixedly connected to the pulley;

the spring receptacle and the circumferential recess overlapping each other, viewed in the axial direction and viewed in the radial direction;

wherein the spring receptacle comprises a spring chamber, wherein the spring chamber comprises a rear wall, wherein the rear wall of the spring chamber comprises an outer side facing away from the connecting spring, wherein the spring chamber comprises an opening configured to enable insertion of the connecting spring into the spring chamber, wherein the pulley comprises a base body comprising a base body width measured in the axial direction from the outer side of the rear wall all the way to the opening, and wherein a maximum width of the connecting spring amounts to at least 80% of the base body width.

12. A starter device comprising a pulley assembly according to claim 1, wherein the starter device comprises a coupling device configured to connect the pulley of the pulley assembly with a crankshaft of the internal combustion engine, wherein the connecting spring of the pulley assembly comprises a second end fixedly connected to the coupling device.

13. The starter device according to claim 12, wherein the coupling device is a follower.

14. The starter device according to claim 13, wherein the spring receptacle of the pulley of the pulley assembly comprises a spring chamber and wherein the follower completely covers the spring chamber in the axial direction of the pulley.

15. The starter device according to claim 12, wherein the coupling device comprises coupling elements configured to couple the starter device with the crankshaft of the internal combustion engine, wherein the coupling device comprises an air guiding collar, wherein the air guiding collar is arranged on a side of the coupling device facing away from the connecting spring, and wherein the air guiding collar is arranged radially outwardly relative to the coupling elements.

16. The starter device according to claim 15, wherein the air guiding collar, in a section view along the axis of rotation of the pulley, comprises at least one conical section.

17. The pulley assembly according to claim 1, wherein the pulley assembly is configured to accommodate in the circumferential recess a plurality of windings of the starter rope.

18. The pulley assembly according to claim 1, wherein the circumferential recess has closed annular shape extending about the axis of rotation.

* * * * *